(12) United States Patent
Arisato (10) Patent No.: US 11,174,959 B2
(45) Date of Patent: Nov. 16, 2021

(54) SEQUENCE VALVE-MOUNTED CYLINDER DEVICE

(71) Applicant: KOSMEK LTD., Kobe (JP)

(72) Inventor: Akira Arisato, Kobe (JP)

(73) Assignee: KOSMEK LTD., Kobe (JP)

( * ) Notice: Subject to any disclaimer, the term of this patent is extended or adjusted under 35 U.S.C. 154(b) by 0 days.

(21) Appl. No.: 16/648,357

(22) PCT Filed: Sep. 14, 2018

(86) PCT No.: PCT/JP2018/034294
§ 371 (c)(1),
(2) Date: Mar. 18, 2020

(87) PCT Pub. No.: WO2019/059136
PCT Pub. Date: Mar. 28, 2019

(65) Prior Publication Data
US 2020/0224783 A1    Jul. 16, 2020

(30) Foreign Application Priority Data
Sep. 21, 2017   (JP) .............................. JP2017-181837

(51) Int. Cl.
*F16K 27/02*      (2006.01)
*F16K 17/196*     (2006.01)
(Continued)

(52) U.S. Cl.
CPC ........ *F16K 27/0209* (2013.01); *F16K 17/196* (2013.01); *F15B 15/204* (2013.01);
(Continued)

(58) Field of Classification Search
CPC ......... Y10T 137/7771; Y10T 137/7772; Y10T 137/7773; Y10T 137/7774;
(Continued)

(56) References Cited

U.S. PATENT DOCUMENTS 3,375,852 A * 4/1968 Milster .................... B60T 8/26
                                              137/493.3
4,016,903 A * 4/1977 Akashi .................. F15B 21/047
                                              137/493.5
(Continued)

FOREIGN PATENT DOCUMENTS

JP         2017-044327 A      3/2017

OTHER PUBLICATIONS

Search Report dated Jul. 17, 2020, issued in corresponding European application No. 18859197.8.
(Continued)

*Primary Examiner* — Jessica Cahill
(74) *Attorney, Agent, or Firm* — Bacon & Thomas, PLLC (57) ABSTRACT

An actuation chamber (2) provided in a housing (1) is communicatively connected to a supply and discharge port (6) via a pressurized oil supply and discharge passage (7). A valve case (11) of a sequence valve (10) is attached to an attachment hole (8) provided at an intermediate portion of the supply and discharge passage (7). A valve seat (25) is provided in a cylindrical hole (20) provided in the valve case (11). A valve member (26) is biased leftward toward the valve seat (25) by a pressure-setting spring (31). When pressure of pressurized oil supplied to a first portion of the supply and discharge passage (7) which is close to the supply and discharge port (6) exceeds a set pressure, the pressurized oil moves the valve member (26) rightward for valve opening, against the pressure-setting spring (31).

7 Claims, 7 Drawing Sheets

(51) Int. Cl.
  *F16K 1/36* (2006.01)
  *F16K 15/02* (2006.01)
  *F15B 15/20* (2006.01)

(52) U.S. Cl.
  CPC .............. *F15B 2211/30505* (2013.01); *F15B 2211/50518* (2013.01); *F16K 1/36* (2013.01); *F16K 15/025* (2013.01)

(58) Field of Classification Search
  CPC . Y10T 137/7778; Y10T 137/778; F16K 1/36; F16K 15/025; F16K 27/0209; F16K 17/196; F15B 15/204; F15B 2211/30505
  See application file for complete search history.

(56) References Cited

U.S. PATENT DOCUMENTS

| | | | | |
|---|---|---|---|---|
| 4,217,927 A * | 8/1980 | Morita | ............... | F16K 17/196 137/454.5 |
| 5,074,330 A * | 12/1991 | Akashi | ............... | F15B 13/02 137/493.3 |
| 5,222,514 A * | 6/1993 | Klotz | ............... | B29C 45/1734 137/1 |
| 10,261,526 B2 * | 4/2019 | Tsuchida | ............... | G05D 16/107 |
| 10,830,365 B2 * | 11/2020 | Pandian | ............... | F15B 13/01 |
| 2007/0023083 A1 * | 2/2007 | Huang | ............... | F16K 17/196 137/226 |
| 2008/0237514 A1 * | 10/2008 | Yonezawa | ............... | F16K 17/0406 251/121 |
| 2009/0289208 A1 * | 11/2009 | Yonezawa | ............... | F15B 21/044 251/216 |

OTHER PUBLICATIONS

Search Report dated Dec. 18, 2018, issued in corresponding International Application No. PCT/JP2018/034294.
Office Action dated May 6, 2021, issued in corresponding Chinese application No. 2018-80061063.4.

* cited by examiner

SEQUENCE VALVE-MOUNTED CYLINDER DEVICE

TECHNICAL FIELD

The present invention relates to a cylinder device including a sequence valve.

BACKGROUND ART

Sequence valves have been conventionally provided at an intermediate portion of a passage line communicatively connecting a pressure fluid supply source to cylinder devices (the passage line can be constituted by a main passage, branch passages, and dedicated passages). Such a sequence valve is, for example, described in Patent Literature 1 (Japanese Unexamined Patent Publication No. 2017-44327). The known sequence valve is structured as follows.

In a valve case of the sequence valve, there are a primary side chamber, a valve seat, and a secondary side chamber, which are provided in series from right to left. The primary side chamber is communicatively connected to a supply source of pressurized oil (pressure fluid). The secondary side chamber is communicatively connected to a supply and discharge port of a cylinder device. A valve member is inserted in the secondary side chamber so as to be movable in a left-right direction. The valve member is biased rightward by a pressure-setting spring toward the valve seat.

To make pressurized oil flow from the primary side chamber to the secondary side chamber of the sequence valve, pressurized oil is supplied to the primary side chamber, and then when the pressure of the pressurized oil in the primary side chamber exceeds a set pressure, the pressurized oil in the primary side chamber moves the valve member leftward for valve opening. Meanwhile, when the pressure of the pressurized oil in the primary side chamber falls below the set pressure, the valve member is moved rightward by the pressure-setting spring, for valve closing.

When pressurized oil flows from the secondary side chamber to the primary side chamber, a check valve provided in the valve member is opened.

CITATION LIST

Patent Literature

Patent Literature 1: Japanese Unexamined Patent Publication No. 2017-44327

SUMMARY OF INVENTION

Technical Problem

The above-described known technique has the following disadvantage.

Sometimes a plurality of cylinder devices are provided on a stationary stand. In such a case, a main passage communicatively connected to a pressurized oil supply source is branched into a plurality of branch passages, and the branch passages are communicatively connected to sequence valves, respectively. The sequence valves are communicatively connected to the cylinder devices through their respective dedicated passages. Due to this, the main passage, the branch passages, the sequence valves, the dedicated passages, the cylinder devices, and the like are disposed complicatedly over a wide range on the stationary stand.

An object of the present invention is to provide a sequence valve-mounted cylinder device which makes it possible to simplify the structure of a passage line through which pressure fluid is supplied and discharged.

Solution to Problem

In order to achieve the above object, in the present invention, a sequence valve-mounted cylinder device is structured as follows, as shown in FIG. 1 to FIG. 2B, FIG. 3A, and FIG. 3B, for example.

A pressure fluid supply and discharge passage 7 communicatively connects an actuation chamber 2 provided in a housing 1 to a supply and discharge port 6. A sequence valve 10 is attached to an attachment hole 8 provided at an intermediate portion of the supply and discharge passage 7. The sequence valve 10 includes: a tubular valve case 11 attached to the housing 1; a valve seat 25, 55; a valve member 26; and a check valve 42. The valve seat 25, 55 is provided in a cylindrical hole 20 of the valve case 11 or in the attachment hole 8. A valve member 26 is hermetically inserted in the cylindrical hole 20 of the valve case 11 via a sealing member 26a so as to be movable in an axial direction. The valve member 26 is biased by a pressure-setting spring 31 toward the valve seat 25, 55. The check valve 42 is provided in the valve member 26. The check valve 42 is configured not to allow pressure fluid to pass therethrough in a direction from the supply and discharge port 6 to the actuation chamber 2 but to allow pressure fluid to pass therethrough in a reverse direction. A cross sectional area A of a first sealed portion 48 of the valve member 26 which is configured to be contacted and sealed by the valve seat 25 is arranged to be smaller than a cross sectional area B of a second sealed portion 49 of the valve member 26 which is sealed by the sealing member 26a. When pressure of pressure fluid supplied to a first portion of the supply and discharge passage 7 which is close to the supply and discharge port 6 exceeds a set pressure, a pressure-receiving portion 50 of the valve member 26 between the first sealed portion 48 and the second sealed portion 49 is pushed by the pressure fluid in the first portion of the supply and discharge passage 7, and the pressure fluid in the first portion of the supply and discharge passage 7 moves the valve member 26 against the pressure-setting spring 31 in a direction in which the valve member 26 separates from the valve seat 25, 55. When the pressure of the pressure fluid in the first portion of the supply and discharge passage 7 falls below the set pressure, the pressure-setting spring 31 moves the valve member 26 in a direction in which the valve member 26 comes into contact with the valve seat 25, 55.

In the above aspect of the present invention, the following functions and effects are provided.

In the above aspect of the present invention, the attachment hole is provided at the intermediate portion of the supply and discharge passage provided in the housing, and the valve case of the sequence valve is attached in the attachment hole. Now reference is made to the known technique in which the main passage, branch passages, sequence valves, dedicated passages, and cylinder devices are provided on the stationary stand. The arrangement of the above aspect of the present invention makes it possible to simplify such a passage line through which pressure fluid is supplied to and discharged from the cylinder devices. This is because the sequence valves and the dedicated passages are not provided on the stationary stand, and the branch passages are communicatively connected directly to the cylinder devices.

It is preferable to incorporate the following features (1) and (2) into the above aspect of the present invention.

(1) As shown in FIGS. 1 to 2B, 3A, and 3B, for example, the cylindrical hole 20 of the valve case 11 and a cylindrical hole 39 provided in the valve member 26 are arranged substantially concentrically with each other. A check valve seat 43 of the check valve 42 is provided in the cylindrical hole 39 of the valve member 26. A check valve member 44 inserted in the cylindrical hole 39 of the check valve member 26 so as to be movable is biased by a valve-closing spring 46 toward the check valve seat 43 so that the check valve member 44 is contactable with the check valve seat 43.

This arrangement allows the sequence valve to have a simple structure.

Figure 1:
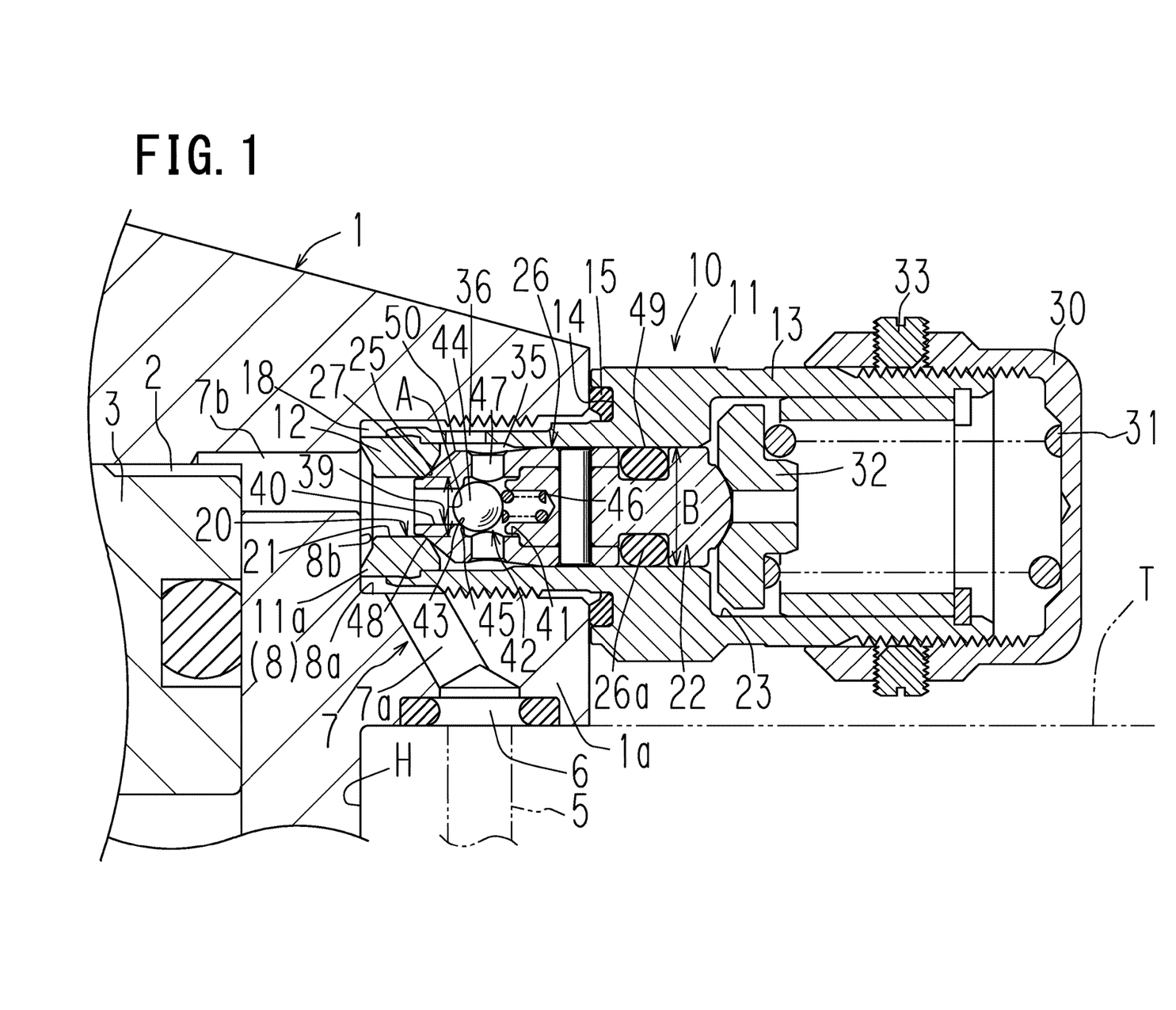
FIG. 1 shows First Embodiment of the present invention, and is a cross-sectional partial view of a sequence valve-mounted cylinder device.
Figure 2A:
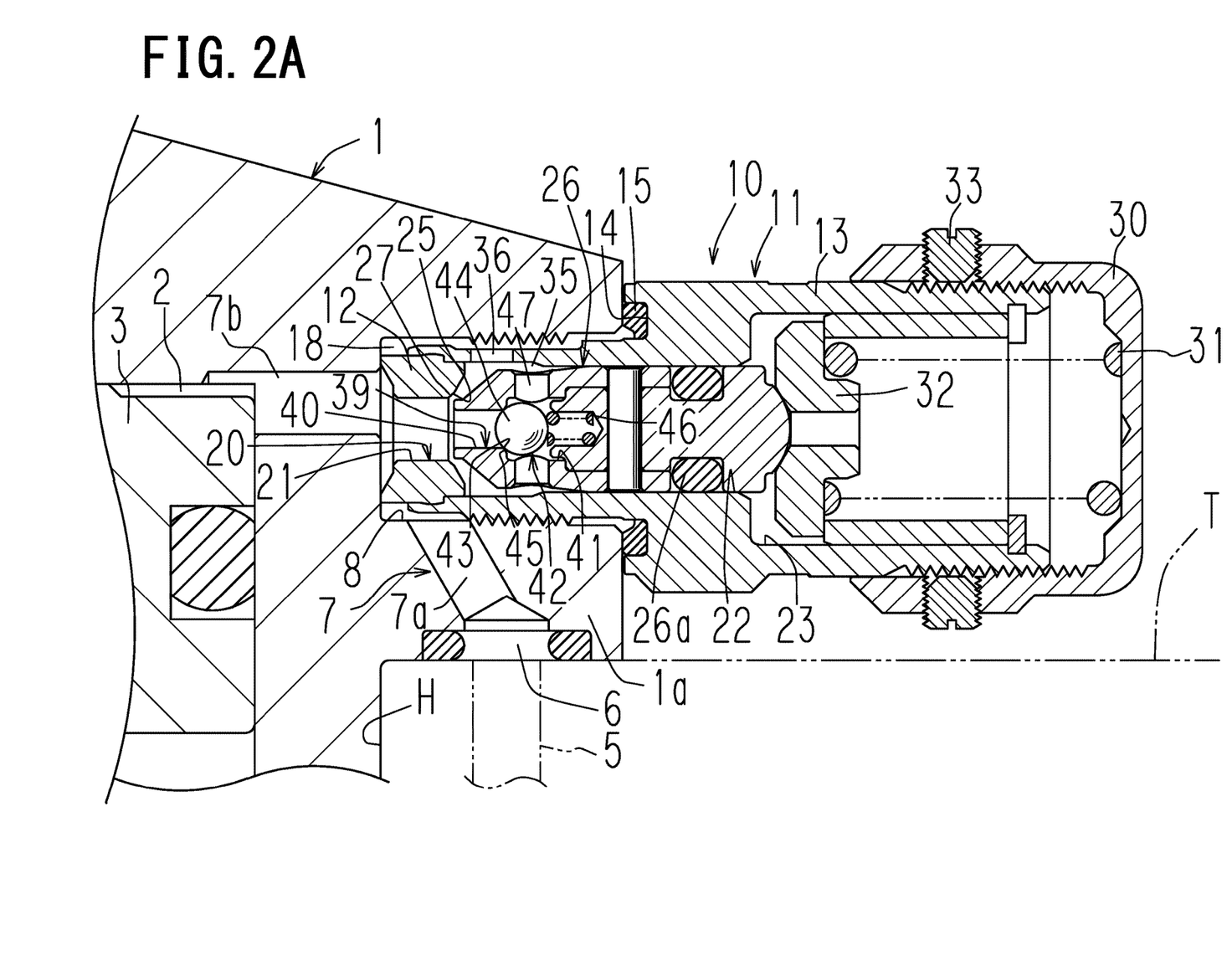
FIG. 2A is a diagram illustrating operation of a valve member of the sequence valve-mounted cylinder device. The diagram shows a valve-opened state of the valve member and is similar to FIG. 1.
Figure 2B:
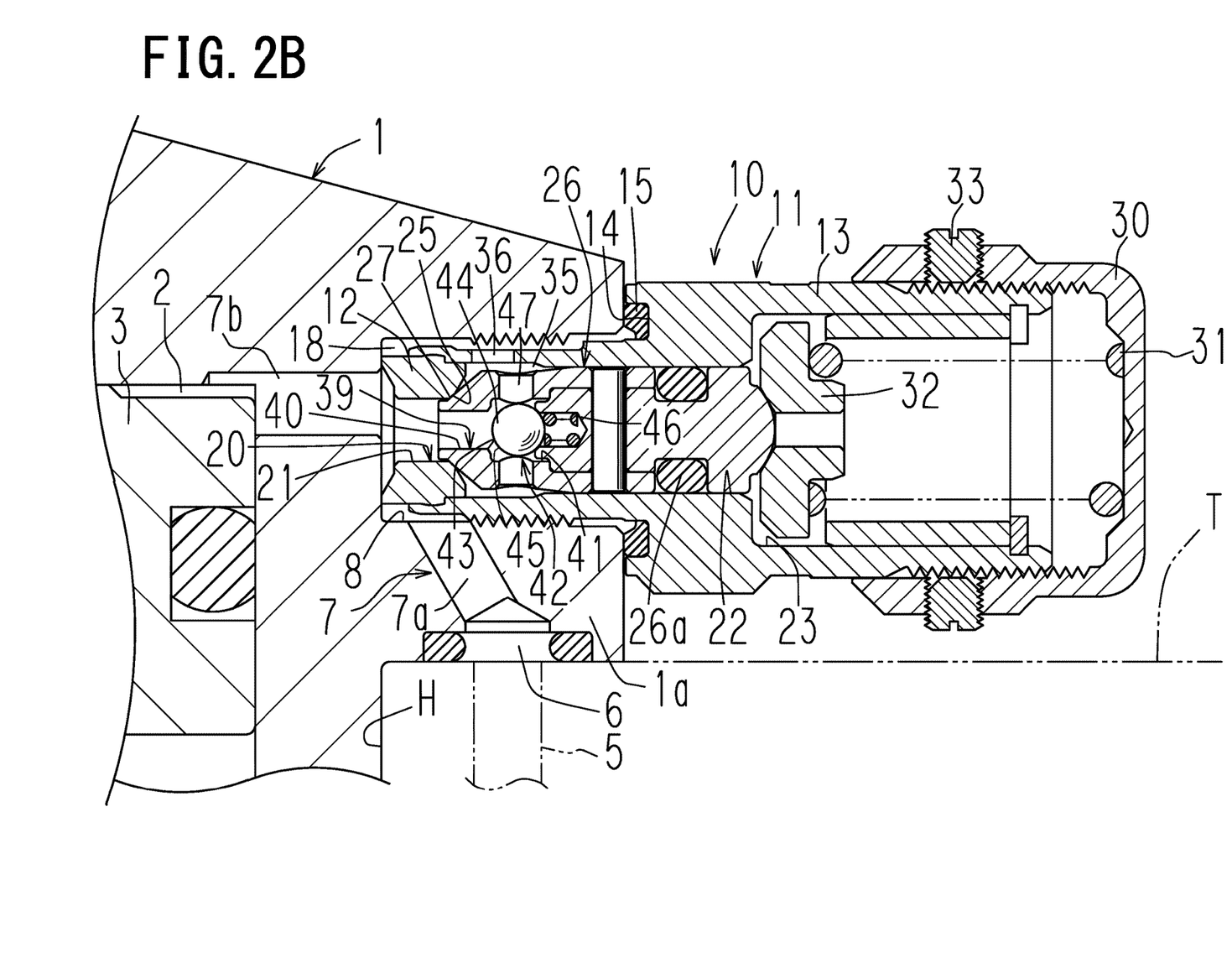
FIG. 2B is a diagram illustrating operation of a check valve member of the sequence valve-mounted cylinder device. The diagram shows a valve-opened state of the check valve member and is similar to FIG. 1.

(2) As shown in FIGS. 1 to 2B, for example, an annular first fluid chamber 18 provided between an inner peripheral surface of the attachment hole 8 and an outer peripheral surface of the valve case 11 is communicatively connected to the first portion of the supply and discharge passage 7 which is close to the supply and discharge port 6. An annular second fluid chamber 35 provided between an inner peripheral surface of the cylindrical hole 20 of the valve case 11 and an outer peripheral surface of the valve member 26 is communicatively connected to the first fluid chamber 18 via a communication passage 36.

In this arrangement, when pressure fluid is supplied from a pressurized oil supply source to the first portion of the supply and discharge passage which is close to the supply and discharge port, pressure fluid at the supply and discharge passage flows into the second fluid chamber via the first fluid chamber, and this allows pressure fluid in the second fluid chamber to reliably actuate the valve member in the cylindrical hole.

DESCRIPTION OF EMBODIMENTS

The following describes First Embodiment of the present invention with reference to FIG. 1 to FIG. 2B.

An insertion hole H is provided so as to extend in an up-down direction in a table T functioning as a stationary stand. A housing 1 of a cylinder device is attached to the insertion hole H. In the housing 1, an actuation chamber 2 is provided to extend in the up-down direction (axial direction). A piston 3 is hermetically inserted in the actuation chamber 2 so as to be movable in the up-down direction. A passage 5 for pressurized oil (pressure fluid) is opened onto a top surface of the table T. A supply and discharge port 6 communicatively connected to the passage 5 is provided at a lower portion of a flange portion 1a of the housing 1. A supply and discharge passage 7 communicatively connected to the supply and discharge port 6 is provided in the housing 1, and the supply and discharge passage 7 is communicatively connected to the actuation chamber 2.

An attachment hole 8 is provided to extend in a horizontal direction (a direction crossing the axis of the housing) at an intermediate portion of the supply and discharge passage 7, at the flange portion 1a of the housing 1. The supply and discharge passage 7 has: a primary side supply and discharge passage 7a provided between the supply and discharge port 6 and the attachment hole 8; and a secondary side supply and discharge passage 7b provided between the attachment hole 8 and the actuation chamber 2. The primary side supply and discharge passage 7a opens onto an inner peripheral surface 8a of the attachment hole 8. The secondary side supply and discharge passage 7b opens onto a left end surface (bottom surface) 8b of the attachment hole 8.

A valve case 11 of a sequence valve 10 is attached to the attachment hole 8. The valve case 11 has a small-diameter portion 12 and a large-diameter portion 13, which are arranged in this order from left to right. An external thread portion provided at a right half portion of the small-diameter portion 12 is screwed to an internal thread portion provided on an inner peripheral wall of the attachment hole 8. A sealing member 15 is attached to an annular groove 14 provided on a left end wall of the large-diameter portion 13. A left end portion 11a of the valve case 11 is in contact with the left end surface 8b of the attachment hole 8. An annular first fluid chamber 18 is created between the inner peripheral surface 8a of the attachment hole 8 and an outer peripheral surface of the small-diameter portion 12 of the valve case 11. The primary side supply and discharge passage 7a of the supply and discharge passage 7 is communicatively connected to the first fluid chamber 18.

A cylindrical hole 20 is provided in the valve case 11 so as to extend in a left-right direction. The cylindrical hole 20 has a small-diameter hole 21, a middle-diameter hole 22, and a large-diameter hole 23, which are arranged in this order from left to right. The small-diameter hole 21 is communicatively connected to the actuation chamber 2 through the secondary side supply and discharge passage 7b of the supply and discharge passage 7. A valve seat 25 is provided at a right end portion of an inner peripheral wall of the small-diameter hole 21. A valve member 26 is hermetically inserted in the middle-diameter hole 22 via a sealing member 26a so as to be movable in the left-right direction. A valve surface 27 is provided at a left end portion of the valve member 26. The valve surface 27 is configured to be contactable with the valve seat 25. An adjustment member 30 screwed to a right end portion of the valve case 11 is fixed to the valve case 11 by a stopper 33. A pressure-setting spring 31 attached in the large-diameter hole 23 biases the valve member 26 leftward toward the valve seat 25 via a spring receiving member 32.

An annular second fluid chamber 35 is provided between an outer peripheral surface of the valve member 26 and an inner peripheral surface of the middle-diameter hole 22. Three first communication passages 36 arranged in a circumferential direction at predetermined intervals are provided in a peripheral wall of the small-diameter portion 12 of the valve case 11. (Note that, only one of the first communication passages 36 is shown in FIG. 1). Through the first communication passages 36, the second fluid chamber 35 is communicatively connected to the first fluid chamber 18. Because of this, when pressurized oil of its supply source is supplied to the passage 5, the pressurized oil passes through the supply and discharge port 6, the primary side supply and discharge passage 7a, the first fluid chamber 18, and the first communication passages 36, and is supplied to the second fluid chamber 35.

In this embodiment, each first communication passage 36 is structured by: a groove provided on an outer peripheral wall of the valve member 26 so as to extend in the left-right direction; and a through hole which opens onto a bottom surface of the groove.

A cylindrical hole 39 is provided in the valve member 26 so as to extend in the left-right direction. The cylindrical hole 39 has a small-diameter hole 40 and a large-diameter hole 41, which are arranged in this order from left to right. A check valve 42 is provided in the cylindrical hole 39. A check valve seat 43 for the check valve 42 is provided at a right end portion of a peripheral wall of the small-diameter hole 40. A ball (check valve member) 44 is inserted in the large-diameter hole 41 so as to be movable in the left-right direction. A check valve surface 45 provided at a left end portion of the ball 44 is configured to be contactable with the check valve seat 43. A valve-closing spring 46 attached in the large-diameter hole 41 biases the ball 44 leftward toward the check valve seat 43. The large-diameter hole 41 of the valve member 26 is communicatively connected to the second fluid chamber 35 via a second communication passage 47 provided through a cylindrical wall of the valve member 26.

A cross sectional area A of a first sealed portion 48 of the valve member 26, which is a portion configured to be in contact with the valve seat 25, is arranged to be smaller than a cross sectional area B of a second sealed portion 49 of the valve member 26, which is a portion sealed by the sealing member 26a. Due to this, pressurized oil supplied to the second fluid chamber 35 pushes rightward a pressure-receiving portion 50, which is between the first sealed portion 48 and the second sealed portion 49, of the valve member 26. When the pressure of the pressurized oil in the second fluid chamber 35 exceeds a set pressure, the pressurized oil reliably moves the valve member 26 rightward.

In this embodiment, the above-mentioned set pressure is determined by a leftward biasing force of the pressure-setting spring 31. To be more specific, the set pressure is a pressure of the pressurized oil in the second fluid chamber 35 at which the pressurized oil in the second fluid chamber 35 starts to move the valve member 26 rightward against the leftward biasing force of the pressure-setting spring 31. The set pressure is adjustable by the adjustment member 30. That is, the set pressure can be raised by rotating the adjustment member 30 in a fastening direction relative to the valve case 11. Meanwhile, the set pressure can be lowered by rotating the adjustment member 30 in a loosening direction.

The above-described sequence valve 10 operates as follows, as shown in FIG. 1 to FIG. 2B.

In an initial state shown in FIG. 1, no hydraulic pressure is applied to the supply and discharge port 6 (and to the primary side supply and discharge passage 7a). Because of this, the pressure-setting spring 31 has moved the valve member 26 to a left limit position via the spring receiving member 32. Therefore, the valve surface 27 of the valve member 26 is in contact with the valve seat 25 to achieve a valve-closed state.

As pressurized oil (pressure fluid) is supplied to the second fluid chamber 35 through the supply and discharge port 6, the primary side supply and discharge passage 7a, the first fluid chamber 18, and the first communication passages 36 in the initial state of FIG. 1, the pressure in the second fluid chamber 35 increases. Then, when the pressure in the second fluid chamber 35 exceeds the set pressure determined by the biasing force of the pressure-setting spring 31, the pressurized oil in the second fluid chamber 35 moves the valve member 26 rightward against the biasing force of the pressure-setting spring 31. Due to this, as shown in FIG. 2A, the valve surface 27 is separated rightward from the valve seat 25 to open the valve. As a result, the pressurized oil in the second fluid chamber 35 flows into the actuation chamber 2 through a valve opening clearance (a clearance created by opening the valve) and through the secondary side supply and discharge passage 7b.

When the pressure in the second fluid chamber 35 falls below the set pressure in a valve-opened state shown in FIG. 2A, the pressure-setting spring 31 moves the valve member 26 leftward. Then, the valve surface 27 is brought into contact with the valve seat 25 for valve closing, as shown in FIG. 1.

When, in a valve-closed state of FIG. 1, the pressure in the secondary side supply and discharge passage 7b exceeds the pressure in the primary side supply and discharge passage 7a, the pressurized oil in the secondary side supply and discharge passage 7b moves the ball 44 rightward. Due to this, as shown in FIG. 2B, the check valve surface 45 of the ball 44 is separated from the check valve seat 43 to open the valve. As a result, the pressurized oil in the secondary side supply and discharge passage 7b is discharged to an outside through: a valve opening clearance; the second communication passage 47; the second fluid chamber 35; the first communication passages 36; the first fluid chamber 18; the primary side supply and discharge passage 7a; the supply and discharge port 6; and the passage 5.

First Embodiment described above has the following advantages.

In First Embodiment, the attachment hole 8 is provided at the intermediate portion of the supply and discharge passage 7 provided in the housing 1, and the valve case 11 of the sequence valve 10 is attached in the attachment hole 8. Now reference is made to a known technique in which sequence valves are provided at an intermediate portion of a passage line communicatively connecting a pressurized oil supply source to cylinder devices. The above arrangement of this embodiment makes it possible to simplify such a passage line through which pressurized oil is supplied to and discharged from the sequence valve-mounted cylinder devices. This is because the sequence valves and their dedicated passages between the sequence valves and the cylinder devices are not provided on the stationary stand, and branch passages are communicatively connected directly to the cylinder devices.

Furthermore, in this embodiment, the sequence valve 10 is provided at the intermediate portion of the supply and discharge passage 7, and this makes it possible to shorten the length of a portion of the supply and discharge passage 7 which is from the sequence valve 10 to the actuation chamber 2. Due to this, as compared to a known technique having a longer passage from a sequence valve to a cylinder device, this embodiment is advantageous in that: a pressure loss in the passage (secondary side supply and discharge passage 7b) is decreased; and pressurized oil is supplied to the actuation chamber 2 upon valve-opening operation on the sequence valve 10 (the cylinder device has higher responsiveness to the valve-opening operation on the sequence valve 10).

Figure 3A:
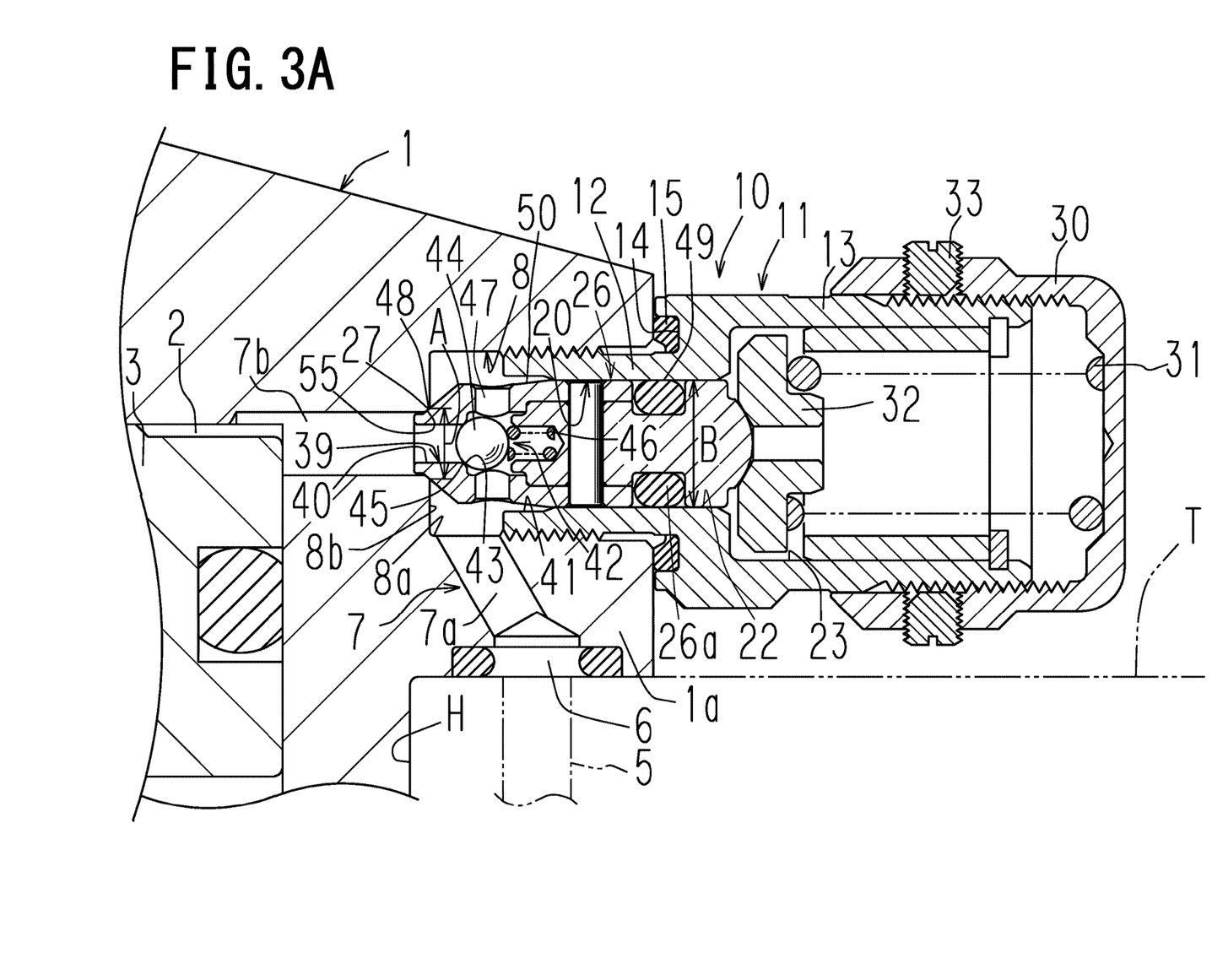
FIG. 3A shows Second Embodiment of the present invention, and is a diagram similar to FIG. 1.
Figure 3B:
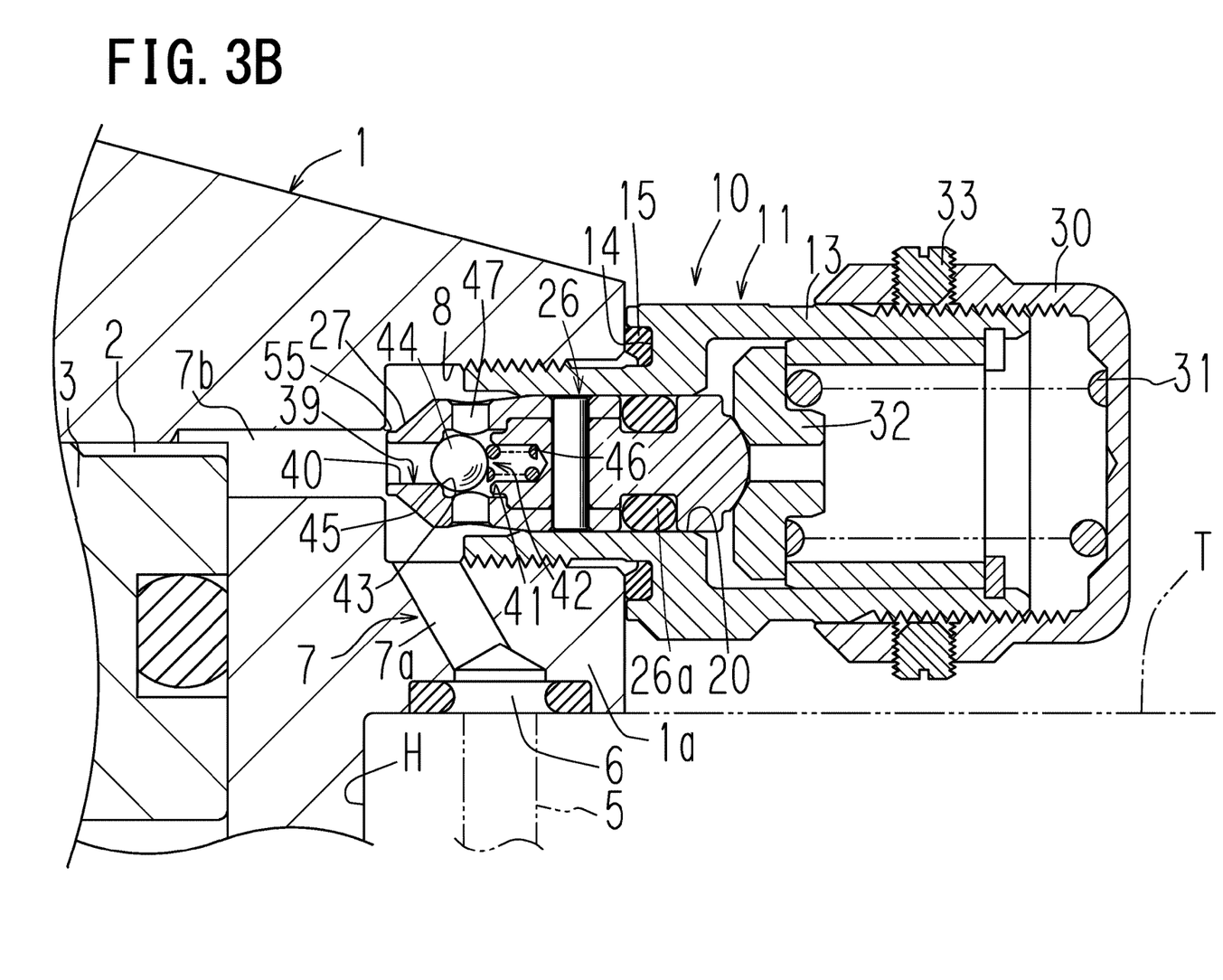
FIG. 3B shows Second Embodiment of the present invention, and is a diagram similar to FIG. 2A.
Figure 4:
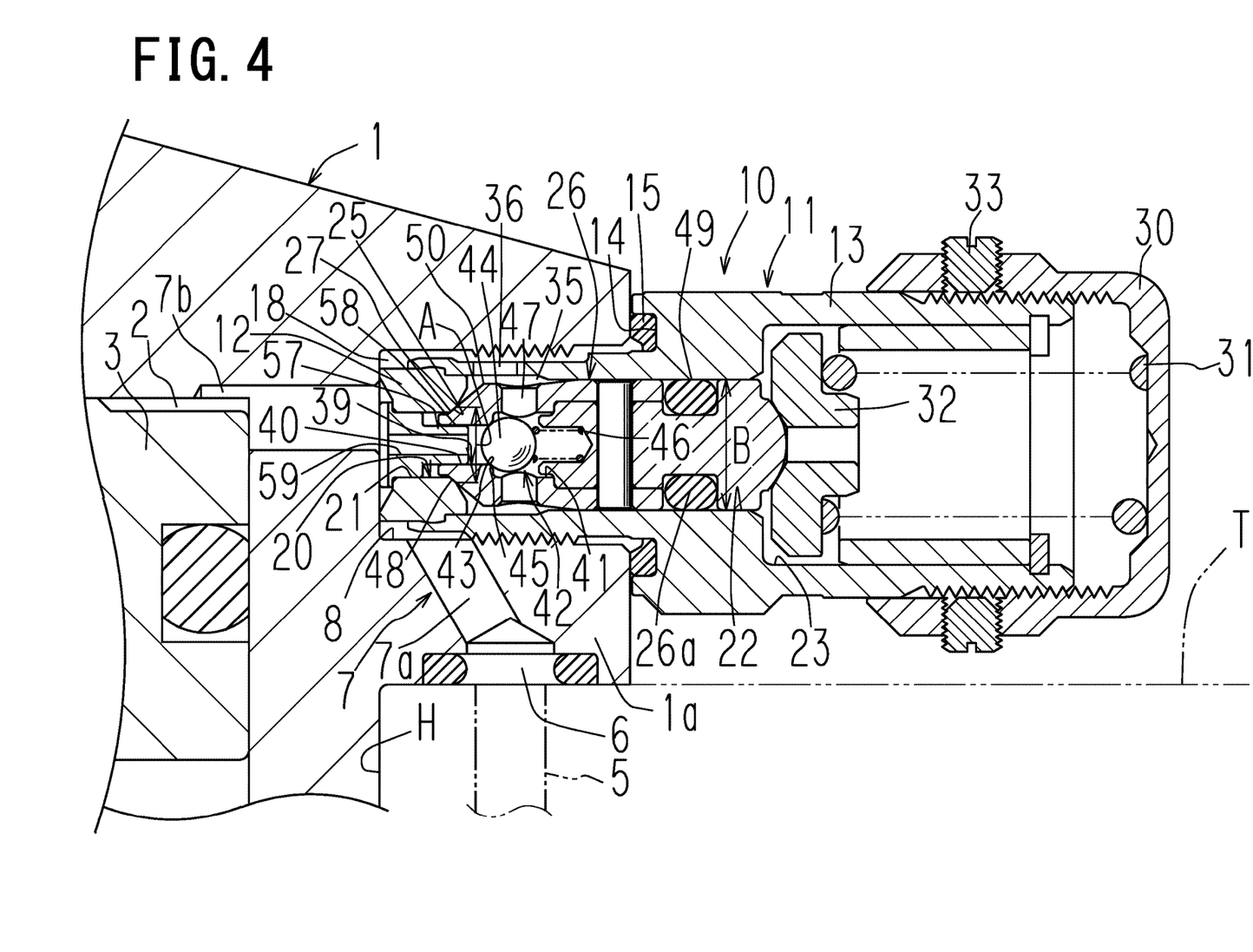
FIG. 4 shows Third Embodiment of the present invention, and is a diagram similar to FIG. 1.
Figure 5:
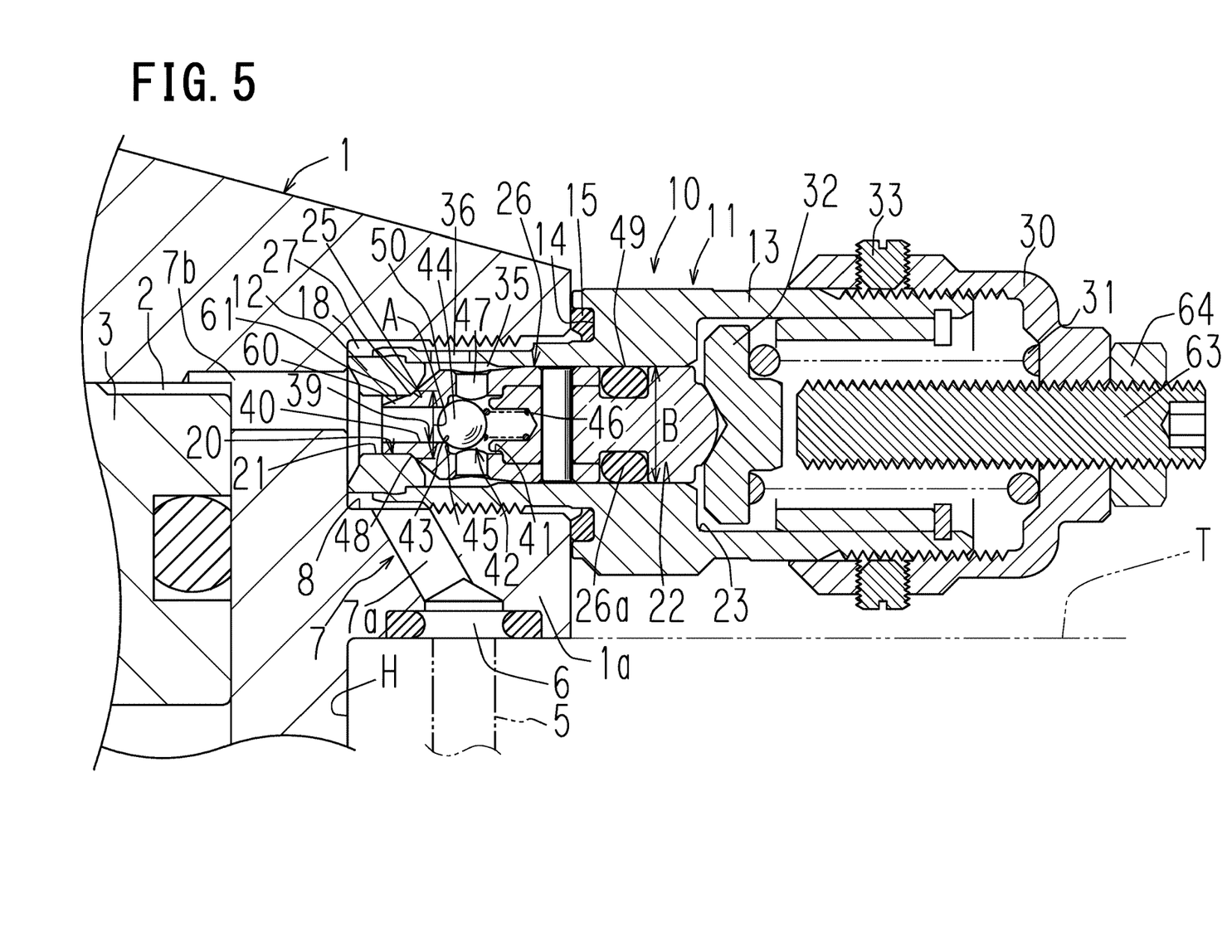
FIG. 5 shows Fourth Embodiment of the present invention, and is a diagram similar to FIG. 1.

FIG. 3A and FIG. 3B show Second Embodiment of the present invention. FIG. 4 and FIG. 5 respectively show Third Embodiment and Fourth Embodiment of the present invention. In description of Second to Fourth Embodiments, components the same as or similar to the components in First Embodiment are given the same reference numerals, in principle.

Second Embodiment is different from First Embodiment in the following points.

The small-diameter portion 12 of the valve case 11 of the sequence valve 10 is screwed to the attachment hole 8. The primary side supply and discharge passage 7a of the supply and discharge passage 7 opens onto the inner peripheral surface 8a of the attachment hole 8.

The cylindrical hole 20 provided in the valve case 11 so as to extend in the axial direction has the middle-diameter hole 22 and the large-diameter hole 23, which are arranged in this order from left to right. The secondary side supply and discharge passage 7b opens onto a bottom surface 8b of the attachment hole 8. A valve seat 55 is provided at a circumferential portion of an opening of the secondary side supply and discharge passage 7b. The valve member 26 is hermetically inserted in the middle-diameter hole 22 via the sealing member 26a so as to be movable in the left-right direction. The valve surface 27 is provided at the left end portion of the valve member 26. The valve surface 27 is configured to be contactable with the valve seat 55.

The cylindrical hole 39 is provided in the valve member 26 so as to extend in the axial direction. The large-diameter hole 41 of the cylindrical hole 39 is communicatively connected to the attachment hole 8 through the second communication passage 47.

Second Embodiment provides the following functions and effects.

Second Embodiment provides functions and effects same as those of First Embodiment.

Furthermore, in Second Embodiment, the valve seat 55 is provided at the bottom wall of the attachment hole 8. Due to this, it is possible to downsize the valve case 11 in the left-right direction, as compared to a case in which the valve seat 25 is provided in the valve case 11, as in First Embodiment.

Third Embodiment shown in FIG. 4 is different from First Embodiment in the following points.

The cylindrical hole 20 is provided in the valve case 11 of the sequence valve 10, and a tubular throttle member 57 is inserted in the small-diameter hole 21 of the cylindrical hole 20. The throttle member 57 has a large-diameter portion and a middle-diameter portion, which are arranged in this order from left to right. A step portion between the large-diameter portion and the middle-diameter portion of the throttle member 57 is in contact with a leading end surface of the valve case 11. The middle-diameter portion is inserted in the small-diameter hole 21 of the cylindrical hole 20 of the valve case 11. A small-diameter portion of the throttle member 57 is inserted in the cylindrical hole 39 of the valve member 26. There is an annular clearance between an outer peripheral surface of the small-diameter portion and an inner peripheral surface of the cylindrical hole 39. The annular clearance functions as a throttle passage 58. The throttle member 57 has a communication hole 59 passing therethrough in the left-right direction. Due to this, pressurized oil supplied from the supply source to the supply and discharge port 6 is supplied to the actuation chamber 2 through: the first fluid chamber 18: the first communication passages 36; the second fluid chamber 35; a valve opening clearance between the valve seat 25 and the valve surface 27; the throttle passage 58; the communication hole 59; and the secondary side supply and discharge passage 7b of the supply and discharge passage 7 of the housing 1. Meanwhile, when pressurized oil in the actuation chamber 2 is discharged to the outside, the pressurized oil in the actuation chamber 2 passes through: the secondary side supply and discharge passage 7b; the communication hole 59; the valve opening clearance of the check valve 42; a second communication hole 47; the second fluid chamber 35; the first communication passages 36; the first fluid chamber 18; and the supply and discharge port 6, to be discharged to the outside. Thus, when pressurized oil is supplied from the supply and discharge port 6 to the actuation chamber 2, the pressurized oil passes through the throttle passage 58, which reduces its flow rate. On the other hand, when pressurized oil is discharged from the actuation chamber 2 to the outside through the supply and discharge port 6, pressurized oil in the actuation chamber 2 does not pass through the throttle passage 58, and therefore the pressurized oil is quickly discharged to the outside.

Third Embodiment provides the following functions and effects.

In the course of supplying pressurized oil from its supply source to the actuation chamber 2, pressurized oil in the second fluid chamber 35, the pressure of which has exceeded a predetermined pressure, passes through the throttle passage 58. Due to this, pressurized oil flows into the actuation chamber 2 gently as compared to that in the cylinder device of First Embodiment described above. Thus, because the pressure in the actuation chamber 2 increases gently, a rapid increase in the pressure in the actuation chamber 2 is prevented. Accordingly, rapid actuation of the piston 3 is prevented.

Fourth Embodiment shown in FIG. 5 is different from First Embodiment in the following points.

The adjustment member 30 is screwed to the right end portion of the valve case 11. An adjustment screw 63 for adjusting the stroke of the valve member 26 is screwed to the adjustment member 30. The adjustment screw 63 is fixed to the adjustment member 30 by a locknut 64. The position of the adjustment screw 63 is adjustable so that the spring receiving member 32 is first to contact an axial end surface of the adjustment screw 63 at the time of rightward movement of the valve member 26 for valve opening. When the valve member 26 is moved rightward to open the valve in this condition, the valve member 26 is received by the adjustment screw 63 via the spring receiving member 32. Accordingly, the maximum flow rate of pressurized oil flowing through a valve opening clearance between the valve seat 25 and the valve surface 27 of the valve member 26 is adjustable by the adjustment screw 63.

Furthermore, a V groove 61, which is shaped so that its depth increases leftward (toward a leading end side), is provided at an outer peripheral wall 60 of a leading end portion of the valve member 26. In the course of supplying pressurized oil from its supply source to the actuation chamber 2, pressurized oil in the second fluid chamber 35, the pressure of which has exceeded a predetermined pressure, passes through the V groove 61. Due to this, the pressurized oil flows into the actuation chamber 2 gently as compared to that in the cylinder devices of the other embodiments described above. Thus, because the pressure in the actuation chamber 2 increases gently, a rapid increase in the pressure in the actuation chamber 2 is prevented. Accordingly, rapid actuation of the piston 3 is prevented. Furthermore, as compared to the tapered throttle passage 58 described in the other embodiments and the like, the V groove 61 of this embodiment makes it easier to adjust the flow rate of pressurized oil passing through the V groove 61.

The above-described embodiments are changeable as follows.

Instead of the pressurized oil described by way of example, pressure fluid may be liquid other than the pressurized oil, or may be gas such as compressed air.

Moreover, it is a matter of course that other changes or alterations can be made on the present invention within the scope of envisagement of one skilled in the art.

REFERENCE SIGNS LIST

1: housing; 2: actuation chamber; 6: supply and discharge port; 7: supply and discharge passage; 8: attachment hole; 10: sequence valve; 11: valve case; 18: first fluid chamber; 20: cylindrical hole; 25: valve seat; 26: valve member; 26*a*: sealing member; 31: pressure-setting spring; 35: second fluid chamber; 36: communication passage (first communication passages); 39: cylindrical hole; 42: check valve; 43: check valve seat; 44: check valve member (ball); 46: valve-closing spring; 48: first sealed portion; 49: second sealed portion; 50: pressure-receiving portion; 55: valve seat.

The invention claimed is:

1. A sequence valve-mounted cylinder device comprising:
   a pressure fluid supply and discharge passage which communicatively connects an actuation chamber provided in a housing to a supply and discharge port; and
   a sequence valve attached to an attachment hole provided at an intermediate portion of the supply and discharge passage,
   wherein the sequence valve comprises:
   a tubular valve case attached to the housing;
   a valve seat provided in a cylindrical hole of the valve case or in the attachment hole;
   a valve member hermetically inserted in the cylindrical hole of the valve case via a sealing member so as to be movable in an axial direction, the valve member being biased by a pressure-setting spring toward the valve seat; and
   a check valve provided in the valve member, the check valve being configured not to allow pressure fluid to pass therethrough in a direction from the supply and discharge port to the actuation chamber but to allow pressure fluid to pass therethrough in a reverse direction,
   wherein a space in which the pressure-setting spring is provided is independent from the actuation chamber,
   wherein a cross sectional area of a first sealed portion of the valve member which is configured to be contacted and sealed by the valve seat is arranged to be smaller than a cross sectional area of a second sealed portion of the valve member which is sealed by the sealing member,
   wherein when pressure of pressure fluid supplied to a first portion of the supply and discharge passage exceeds a set pressure determined by biasing force of the pressure-setting spring, a pressure-receiving portion of the valve member between the first sealed portion and the second sealed portion is pushed by the pressure fluid in the first portion of the supply and discharge passage, and the pressure fluid in the first portion of the supply and discharge passage moves the valve member against the pressure-setting spring in a direction in which the valve member separates from the valve seat, and
   wherein when the pressure of the pressure fluid in the first portion of the supply and discharge passage falls below the set pressure, the pressure-setting spring moves the valve member in a direction in which the valve member comes into contact with the valve seat.

2. The sequence valve-mounted cylinder device according to claim 1, wherein:
   the cylindrical hole of the valve case and a cylindrical hole provided in the valve member are arranged substantially concentrically with each other; and
   a check valve seat of the check valve is provided on an inner peripheral surface of the cylindrical hole of the valve member, and a check valve member inserted in the cylindrical hole of the valve member so as to be movable is biased by a valve-closing spring toward the check valve seat so that the check valve member is contactable with the check valve seat.

3. The sequence valve-mounted cylinder device according to claim 2, wherein:
   an annular first fluid chamber provided between an inner peripheral surface of the attachment hole and an outer peripheral surface of the valve case is communicatively connected to the first portion of the supply and discharge passage; and
   an annular second fluid chamber provided between an inner peripheral surface of the cylindrical hole of the valve case and an outer peripheral surface of the valve member is communicatively connected to the first fluid chamber via a communication passage.

4. The sequence valve-mounted cylinder device according to claim 1, wherein:
   an annular first fluid chamber provided between an inner peripheral surface of the attachment hole and an outer peripheral surface of the valve case is communicatively connected to the first portion of the supply and discharge passage; and
   an annular second fluid chamber provided between an inner peripheral surface of the cylindrical hole of the valve case and an outer peripheral surface of the valve member is communicatively connected to the first fluid chamber via a communication passage.

5. The sequence valve-mounted cylinder device according to claim 1, wherein,
   the cylindrical hole has a large-diameter hole in which the pressure-setting spring is provided, and
   a spring receiving member is provided in the large-diameter hole and between the valve member and the pressure-setting spring.

6. The sequence valve-mounted cylinder device according to claim 5, wherein,
   an end portion of the valve member in the axial direction is arc-shaped in cross section, and
   a contact portion of the spring receiving member, which is in contact with the end portion of the valve member in the axial direction, is arc-shaped in cross section so that the contact portion is in surface contact with the end portion.

7. The sequence valve-mounted cylinder device according to claim 1, wherein,
   a cylindrical adjustment member is screwed to an end portion of the tubular valve case, and
   the set pressure is adjustable by the adjustment member.

* * * * *